United States Patent
Schmutz

(10) Patent No.: US 10,721,876 B1
(45) Date of Patent: Jul. 28, 2020

(54) MULCH BLOWER TRUCK CONVERSION

(71) Applicant: David Schmutz, Nashville, TN (US)

(72) Inventor: David Schmutz, Nashville, TN (US)

( * ) Notice: Subject to any disclaimer, the term of this patent is extended or adjusted under 35 U.S.C. 154(b) by 178 days.

(21) Appl. No.: 15/890,345

(22) Filed: Feb. 6, 2018

Related U.S. Application Data

(63) Continuation-in-part of application No. 14/985,707, filed on Dec. 31, 2015, now abandoned.

(60) Provisional application No. 62/099,073, filed on Dec. 31, 2014.

(51) Int. Cl.
*A01G 13/02* (2006.01)
*B62D 65/02* (2006.01)
*A01C 15/04* (2006.01)
*E01C 19/20* (2006.01)

(52) U.S. Cl.
CPC .......... *A01G 13/0287* (2013.01); *A01C 15/04* (2013.01); *B62D 65/02* (2013.01); *E01C 19/205* (2013.01); *A01G 13/0262* (2013.01)

(58) Field of Classification Search
CPC ............ A01G 13/0287; A01G 13/0262; B62D 65/02; E01C 19/205; A01C 15/04
USPC .................. 239/650, 654, 663, 588; 406/194
See application file for complete search history.

(56) References Cited

U.S. PATENT DOCUMENTS

| | | | | |
|---|---|---|---|---|
| 3,241,173 A | * | 3/1966 | Finn ...................... | E01H 1/0845 |
| | | | | 239/663 |
| 5,170,947 A | * | 12/1992 | Houle ..................... | B60P 1/165 |
| | | | | 239/663 |
| 6,290,150 B1 | * | 9/2001 | Jones ..................... | A01C 15/04 |
| | | | | 239/654 |
| 6,666,627 B1 | * | 12/2003 | Wysong ............. | B65G 53/4641 |
| | | | | 406/192 |
| 2017/0190275 A1 | * | 7/2017 | Helmsderfer ........ | A01C 15/003 |

\* cited by examiner

*Primary Examiner* — Steven J Ganey
(74) *Attorney, Agent, or Firm* — Miller & Martin PLLC

(57) ABSTRACT

A conversion is provided to adapt a salt truck spreading apparatus to a mulch blowing delivery system by replacing a centrifugal spreader with an air lock and blower while providing means to address clogs in the feeding of mulch.

15 Claims, 15 Drawing Sheets

| Block Number (Type) | Parameter |
|---|---|
| C001 Airlk_sp(Frequency trigger) : | ON=8+<br>OFF=4<br>G_T=01:30s |
| I1 (Normally Open Contact) :<br>Chain SS off position | |
| I2 (Normally Open Contact) :<br>Remote button | |
| I3 (Normally Closed Contact) :<br>Airlock in off position | |
| I4 (Normally Open Contact) :<br>Airlock Sensor | |
| M1 (Normally Open Contact) :<br>Auto_Enabled_Bit | |
| M1 (Normally Open Contact) :<br>Auto_Enabled_Bit | |
| M1 (Normally Open Contact) :<br>Auto_Enabled_Bit | |
| M1 (Output) :<br>Auto_Enabled_Bit | |
| M1 (Normally Open Contact) :<br>Auto_Enabled_Bit | |
| M2 (Output) :<br>Airlock not at speed bit | |
| M2 (Normally Open Contact) :<br>Airlock not at speed bit | |
| T002 (On-Delay) : | Rem = off<br>04:00s+ |
| T003 (On-Delay) :<br>Airlock not at speed timer | Rem = off<br>02:00s+ |

*FIG. 10B*

| Block Number (Type) | Parameter |
|---|---|
| T003 (Normally Open Contact) : Airlock not at speed timer | |
| T003 (Normally Open Contact) : Airlock not at speed timer | |
| T003 (Normally Open Closed Contact) : Airlock not at speed timer | |
| T004 (Normally Open Closed Contact) : Airlock not at speed timer | |
| T004 (On-Delay) : run reverse timer | Rem = off 02:00s+ |

*FIG. 10C*

| Connection | Label |
|---|---|
| I1 | Chain_SS |
| I2 | Rem_PB |
| I3 | AirLock_SS |
| I4 | AirLock_PX |
| I5 | |
| I6 | |
| I7 | |
| I8 | |
| I9 | |
| I10 | |
| I11 | |
| I12 | |
| I13 | |
| I14 | |
| I15 | |
| I16 | |
| I17 | |
| I18 | |
| I19 | |
| I20 | |
| I21 | |
| I22 | |
| I23 | |
| I24 | |
| C1 | |
| C2 | |
| C3 | |
| C4 | |
| F1 | |
| F2 | |
| F3 | |
| F4 | |
| S1 | |

*FIG. 10D*

| Connection | Label |
|---|---|
| S2 | |
| S3 | |
| S4 | |
| S5 | |
| S6 | |
| S7 | |
| S8 | |
| AI1 | |
| AI2 | |
| AI3 | |
| AI4 | |
| AI5 | |
| AI6 | |
| AI7 | |
| AI8 | |
| Q1 | DragChain |
| Q2 | AirLock_FWD |
| Q3 | AirLock_REV |
| Q4 | |
| Q5 | |
| Q6 | |
| Q7 | |
| Q8 | |
| Q9 | |
| Q10 | |
| Q11 | |
| Q12 | |
| Q13 | |
| Q14 | |
| Q15 | |
| Q16 | |
| AQ1 | |
| AQ2 | |

*FIG. 10E*

| Connection | Label |
|---|---|
| X1 | |
| X2 | |
| X3 | |
| X4 | |
| X5 | |
| X6 | |
| X7 | |
| X8 | |
| X9 | |
| X10 | |
| X11 | |
| X12 | |
| X13 | |
| X14 | |
| X15 | |
| X16 | |

*FIG. 10F*

MULCH BLOWER TRUCK CONVERSION

The present application is a continuation-in-part of U.S. Ser. No. 14/985,707 filed Dec. 31, 2015, which claims the benefit of U.S. Provisional Application Ser. No. 62/099,073 filed Dec. 31, 2014.

FIELD OF THE INVENTION

The present invention relates to the conversion of material handling trailers to operate as mulch blowers.

BACKGROUND OF THE INVENTION

In commerce today there are employed a wide variety of material handling trucks or truck trailers. These trucks are employed for diverse purposes such as refuse collection, delivery of building materials such as sand, carriage of food products such as grain, rice, and dry beans, and of particular interest herein, the transport of salt for deicing roadways and the carriage of mulch and woodchip material for distribution in landscaping applications. Many of these material handling trucks utilize a V-bed design which has relatively wide opening at the top through which material can be loaded into the trailer and a narrower bottom portion. In a V-bed trailer, one common material moving device is a drag link conveyor system which operates to pull the bottom layers of material resting in from the narrow lower portion of the V shaped bed from front to rear where the material exits the trailer. An alternative material moving device in V-bed trailers is an auger which rotates to push material to the rear. In other trailers, the material handling mechanism may be a hydraulic ram that pushes from front to back thereby emptying the material deposited in the trailer from the back portion, or a walking floor system in which slats at the bottom of the trailer are moved hydraulically to push the trailer contents towards the rear of the trailer.

A live floor or reciprocating slat system is particularly suitable in a trailer which is relatively rectangular as opposed to V shaped and is employed in mulch handling trailers as typified by apparatus similar to that in U.S. Pat. No. 8,616,365. Hydraulic ram systems are commonly deployed in refuse handling trucks where compressed garbage can be pushed from the trailer into a landfill or recycling facility by operation of the hydraulic ram. Drag link systems in V-bed trailers are commonly employed for handling salt and grains.

A truck with material handling trailer or truck bed is generally an expensive piece of machinery. A truck/trailer combination with a capacity of five yards or more of material will frequently cost from $75,000 up to over $200,000. With such a sizeable capital investment in a material handling vehicle, it is desirable to obtain as much use as possible from the capital investment.

Specifically, salt spreading trucks, commonly constructed with V-bed and draglink system to convey salt materials from the trailer to a spreader at the back of the trailer are used in the winter months while mulch blowing trucks are used in the course of the remainder of the year when there is no ice. Many landscape service providers and municipalities with responsibilities for roadways and park lands are desirous of providing both salt spreading and mulch blowing services. However, for two types of material handling trucks the associated usage is entirely seasonal and complimentary. In addition, both the most commonly used material moving devices and dispersal apparatus are different in the salt and mulch spreading vehicles. So, for moving salt, an auger or drag link system is commonly used, while the reciprocating slat is particularly suited for the much lighter weight mulch material. Mulch is also relatively easy to entrain in air flow and can be blown into place, while relatively dense salt is more commonly dispersed with a rotational spreader.

A mulch blowing truck provides significant advantage over the manual distribution of mulch. For instance, in a typical small residential application situation, the manual spreading of mulch over a 1,000 square foot area might require ten man hours of labor and ten square yards of mulch product. However, a mulch blower could provide better coverage and faster application so that the same 1,000 square feet might be covered with only five square yards of mulch product and only about 1.5 to 3.5 man hours of labor. In spite of these significant savings in labor and material cost, it is often difficult to justify the investment of funds in a dedicated mulch blowing truck considering that there is not only the initial capital expense of purchasing the truck, but also operating costs including vehicle insurance and maintenance for the full year that must be recovered in only part-year operation.

Economies could be realized if existing material handling trucks such as salt spreader trucks, which are only used when weather is unsuitable for applying mulch products, could also be utilized in other parts of the year for mulch spreading without incurring additional capital and maintenance costs that would be associated with an entirely new truck. Therefore, the present invention is directed to the reversible modification of material handling trucks to be adapted to handle and blow mulch.

DRAWINGS

These and other features, aspects, and advantages of the present invention win become better understood with regard to the following description, appended claims, and accompanying drawings where:

FIG. 10A through 10F is an exemplary instruction listing for a controller to operate a mulch blower truck conversion.

DETAILED DESCRIPTION OF THE DRAWINGS

Figure 1:
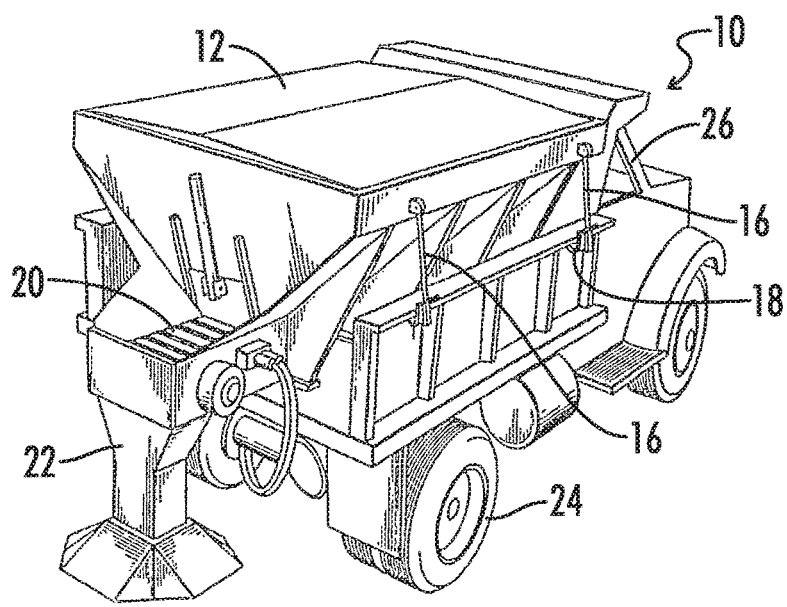
FIG. 1 is a rear perspective view of a prior art V-bed material handling assembly mounted in a truck adapted for salt spreading.

The invention may be better appreciated with some understanding of the existing salt spreading and mulch blowing apparatus in current use. As illustrated in FIG. 1, for spreading salt on roadways, frequently a conventional truck 10 is provided with a removable V-bed hopper 12 which is strapped to the bed of the truck by straps 16 and suitable bolting apparatus 18. The hopper 12 is provided with an integrally mounted conveyor 20 which projects rearwardly from the hopper. At the rear of the V-bed is mounted a spreading apparatus 22. In practice, the typical conveyor 20 would be a drag link or auger system to move salt from the hopper 12 of the V-bed to the salt spreading apparatus 22. It can be seen that the conveyor 20 moves material from the hopper 12 to the rear of the truck bed, aft of the rear wheels 24 of the truck. The typical salt spreading apparatus 22 is a centrifugal spreader consisting of a rotating disk with blades fixed to the surface. The salt is poured onto the spreader disk colliding with the rotating blades, accelerating outwards, before it eventually leaves the spreader.

Figure 2:
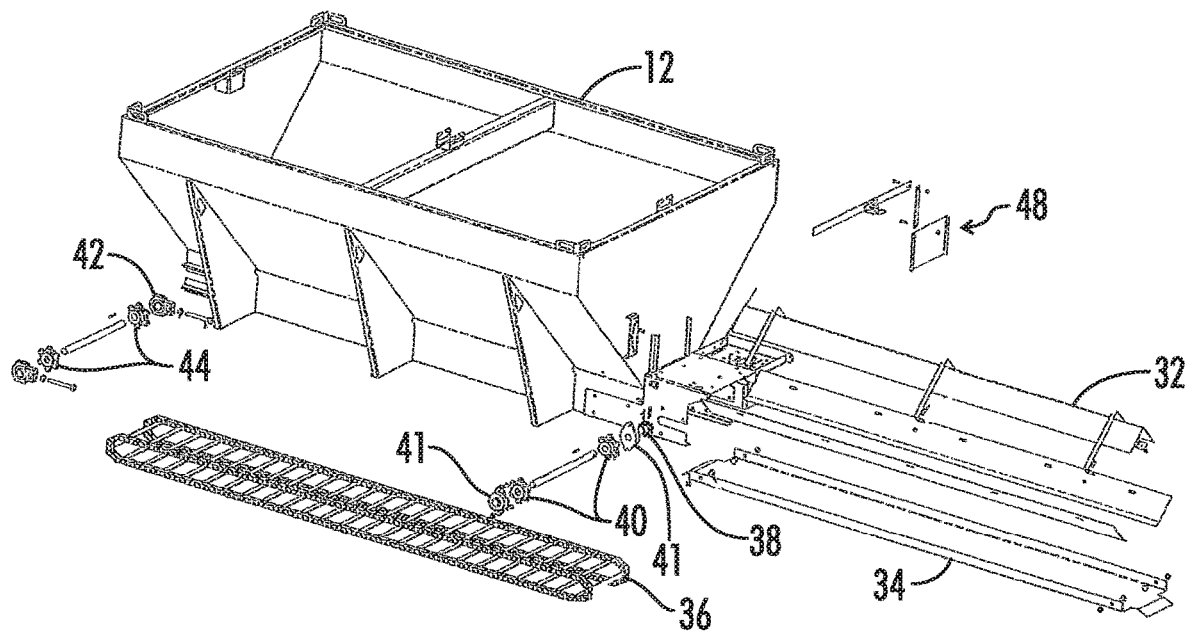
FIG. 2 is an exploded side perspective view of an exemplary V-bed with the drag link material handling apparatus visible.

In FIG. 2, an exemplary drag link system can be better understood with reference to hopper 12 which allows for easy loading in a wide upper end and funnels the material deposited in the V-bed to the lower narrower portion where the contents will flow over the inverted V 32 into troughs 30 above the pan conveyor floor 34. The feed gate assembly 48 helps meter the flow of material that is brought to the rear of the hopper 12 by operation of the chain conveyor 36 which is rotated by sprockets at the rear 40 and front 44 revolving with the use of rear bearings 42 and front bearings 41 and powered by coupling 38 with driven gear box. The chain conveyor 36 drags material on the pan conveyor floor 34 rearward. The strap attached V-bed hopper 12 allows the truck to be converted to haul brush and debris in warmer weather, but some salt spreader truck designs have permanently mounted V-beds.

Figure 3:
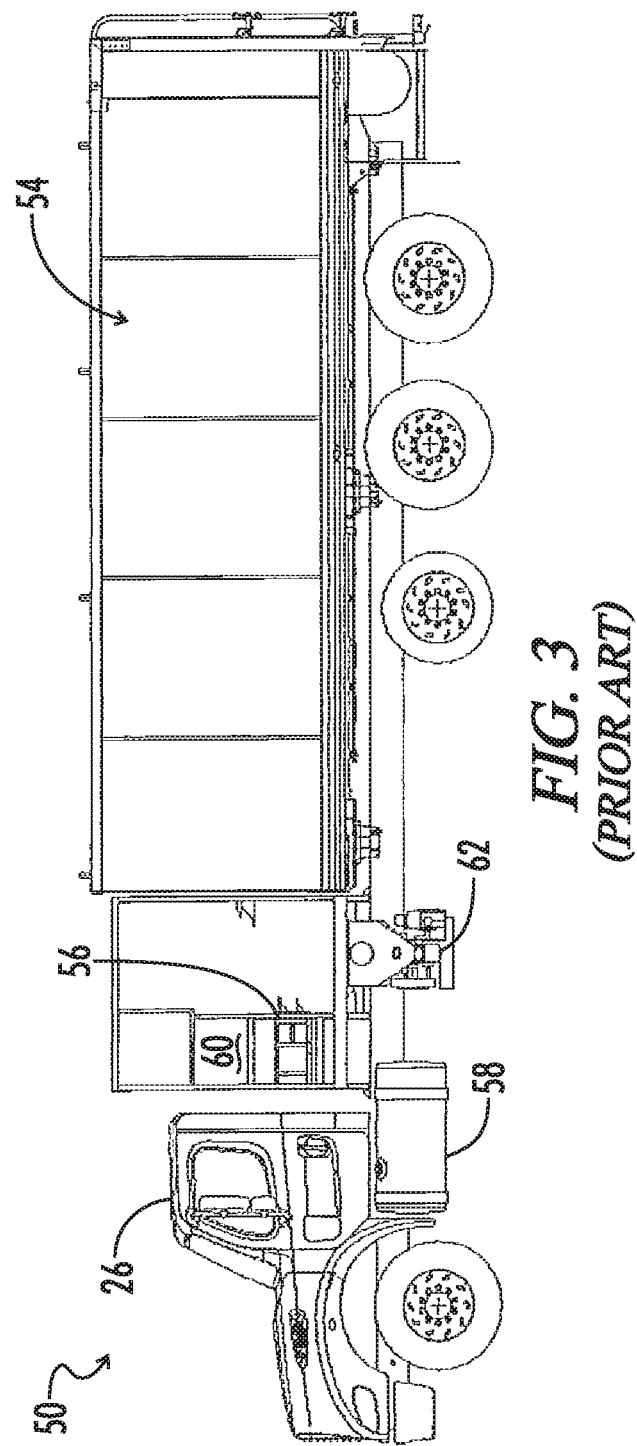
FIG. 3 is a side plan view of a prior art mulch handling truck.

The construction of a salt spreader truck is significantly different from common mulch blower trucks, such as truck 50 depicted in FIG. 3. The truck 50 comprises cab 26, material bed 54, material handling apparatus, fuel tank 58, mulch blowing engine 56, hydraulic tanks, blower and injector, and mulch hose storage 60. The material handling apparatus of a dedicated mulch blower truck is commonly a walking floor and vacuum type apparatus since the relatively light weight of mulch provides greater material handling opportunities than is the case with salt.

Figure 4:
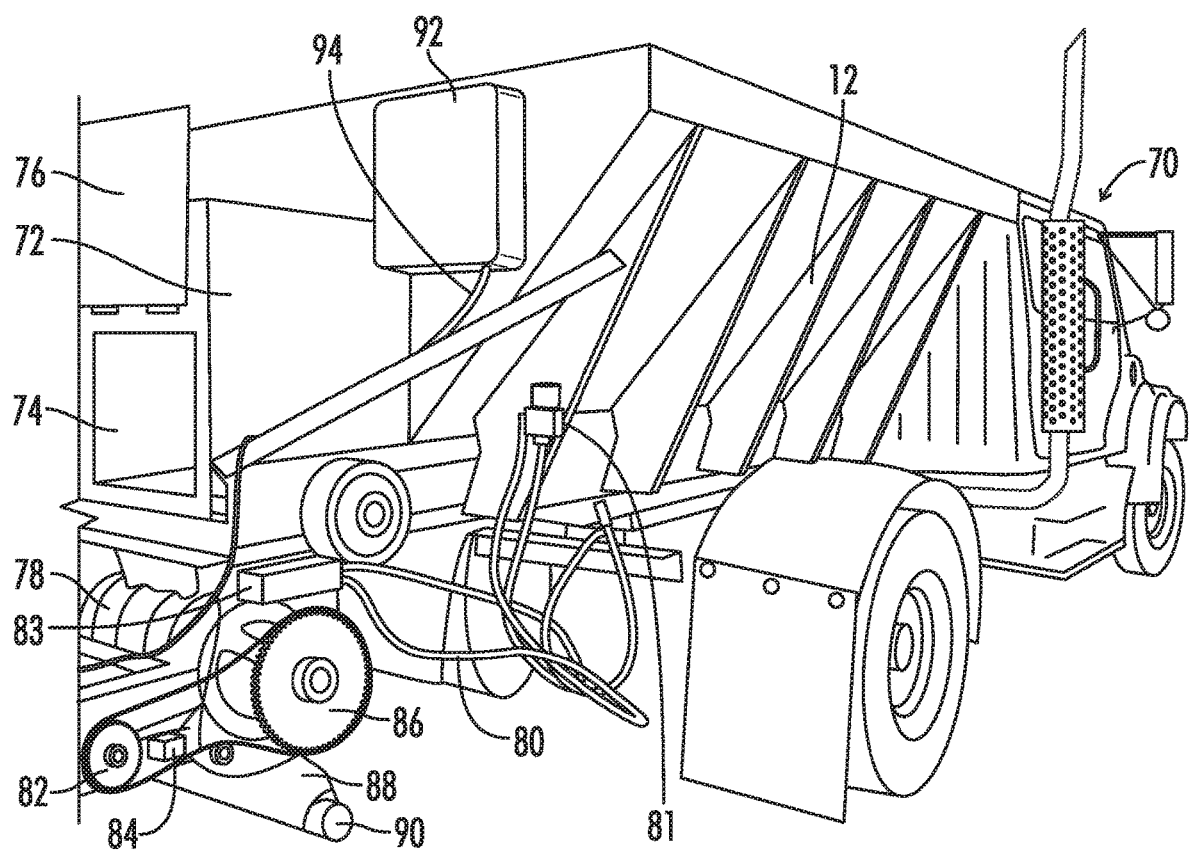
FIG. 4 is a rear right side perspective view of a V-bed truck modified to include a mulch blowing attachment.
Figure 5:
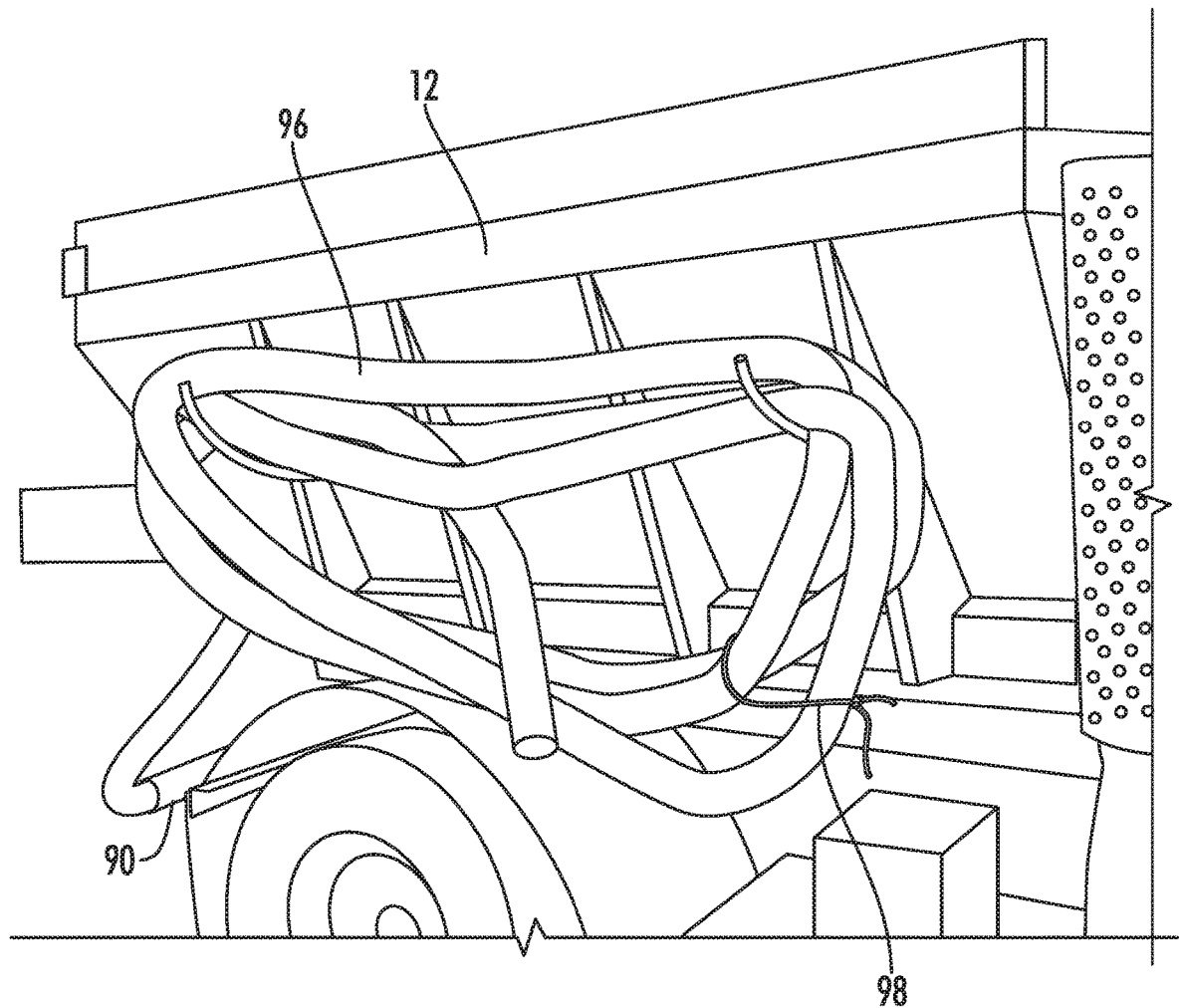
FIG. 5 is a right side view of the modified truck of FIG. 4 with the mulch blowing hose attached.

Turning then to an embodiment of the present invention, in FIG. 4, it can be seen that salt spreading apparatus has been removed from the rear of a V-bed hopper 12 that is permanently mounted on truck 70. In the illustrated conversion, a metering device such as air lock 78 has been added but is powered by hydraulic motor 82 that drives air lock 78 utilizing chain linkage 84. In addition, an agitator box 72 has been added with door 76 to provide access to materials being pulled by the material handling apparatus from the bed 12. In practice, with a good material handling apparatus, this agitator box is not required, however, it does provide safe and direct access to the material handling apparatus, when the apparatus is stopped. The controls 92 include a plurality of wires 94 that connect to fuse box and solenoid 81 for controlling operation of the material handling drag link apparatus and may also connect with other operational aspects of the apparatus including the blower and air lock. Significantly, the controller 92 may also provide remote control functionality for the material handling process so that it can start, stop, and adjust drag link speed to match the needed flow of mulch material, and may even reverse the drag link to attempt to dislodge any material that may have jammed in the feed apparatus. The remote control may be a separate unit or may be built into the hose end for ready access. Such a remote control may operate by radio frequency communication with the controller, or by wired connection as depicted in FIG. 8B. Hydraulic cables 80 from the hydraulic system of truck 70 go not only to operate the material handling apparatus as through that connection 83 but also to power the hydraulic motor 82 that runs the air lock 78. The air lock 78 meters mulch from the agitator box 72 into pan 88 below the air lock 78. Mulch that is metered into pan 88 is then blown by the pressurized air passing from left to right through the pan 88 and exiting through opening 90. As shown in FIG. 5, opening 90 connects to delivery hose 96 that may be from about 30 feet to about 250 feet in length and the hose may be stored on brackets alongside hopper 12 and secured in place by tie down 98 when not in use or on a storage reel that enables the hose to be wound and unwound without kinking.

Figure 6:
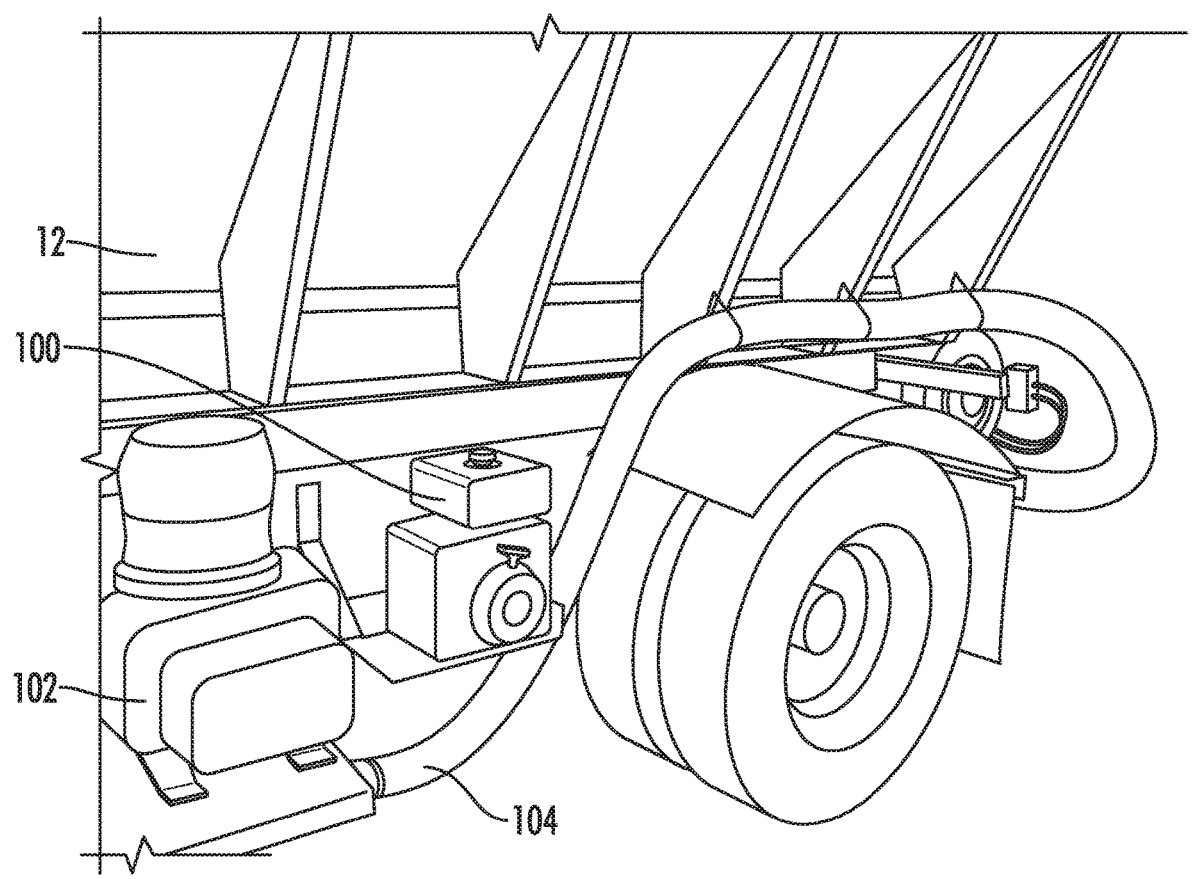
FIG. 6 is a left side perspective view of the truck of FIG. 4 showing the rim blower utilized to blow mulch.
Figure 7:
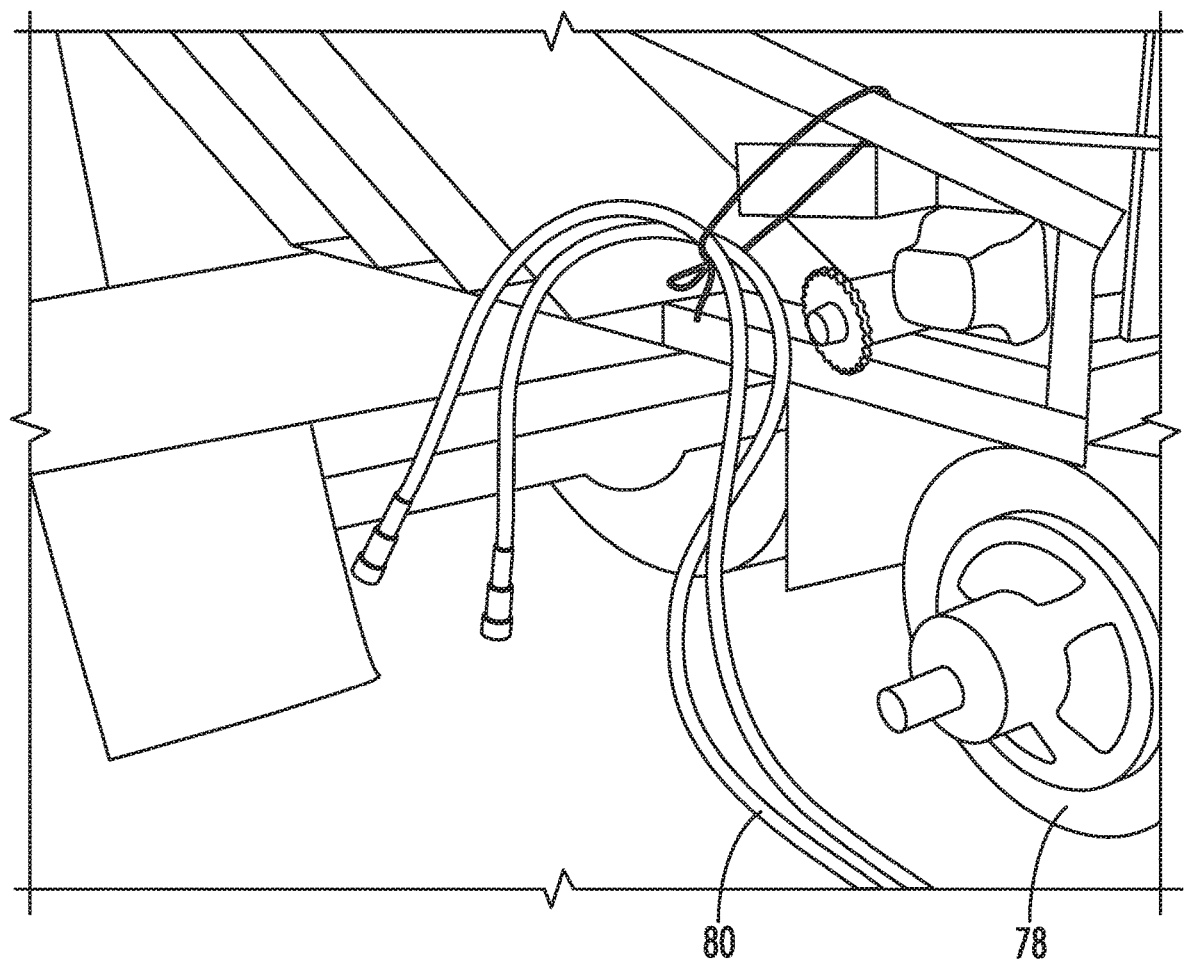
FIG. 7 is a close-up view showing the hydraulic attachments of the air lock that meters mulch into pan for blowing.

FIG. 6 illustrates an embodiment of the blower apparatus including a twelve horse power gasoline motor 100 to power belt driven ram blower 102 to generate air pressure conveyed through hose 104 to the left side of pan 88 (shown in FIG. 4) and thence to blow the mulch that is metered into pan 88 by airlock 78. While the illustrated embodiment shows the blower 102 powered by an independent motor, it is also possible to utilize an electric motor powered by the generator of the truck 70 or a hydraulic motor with appropriate gearing driven by truck hydraulic systems. FIG. 7 illustrates hydraulic hoses 80 that connect to hydraulic motor 82 in order to power air lock 78. It can be appreciated that air lock 78 may be powered in a variety of fashions such as is the case with ram blower 102, for example by the use of independent gasoline motor, or an electric motor, in each case with appropriate gearing.

Figure 8A:
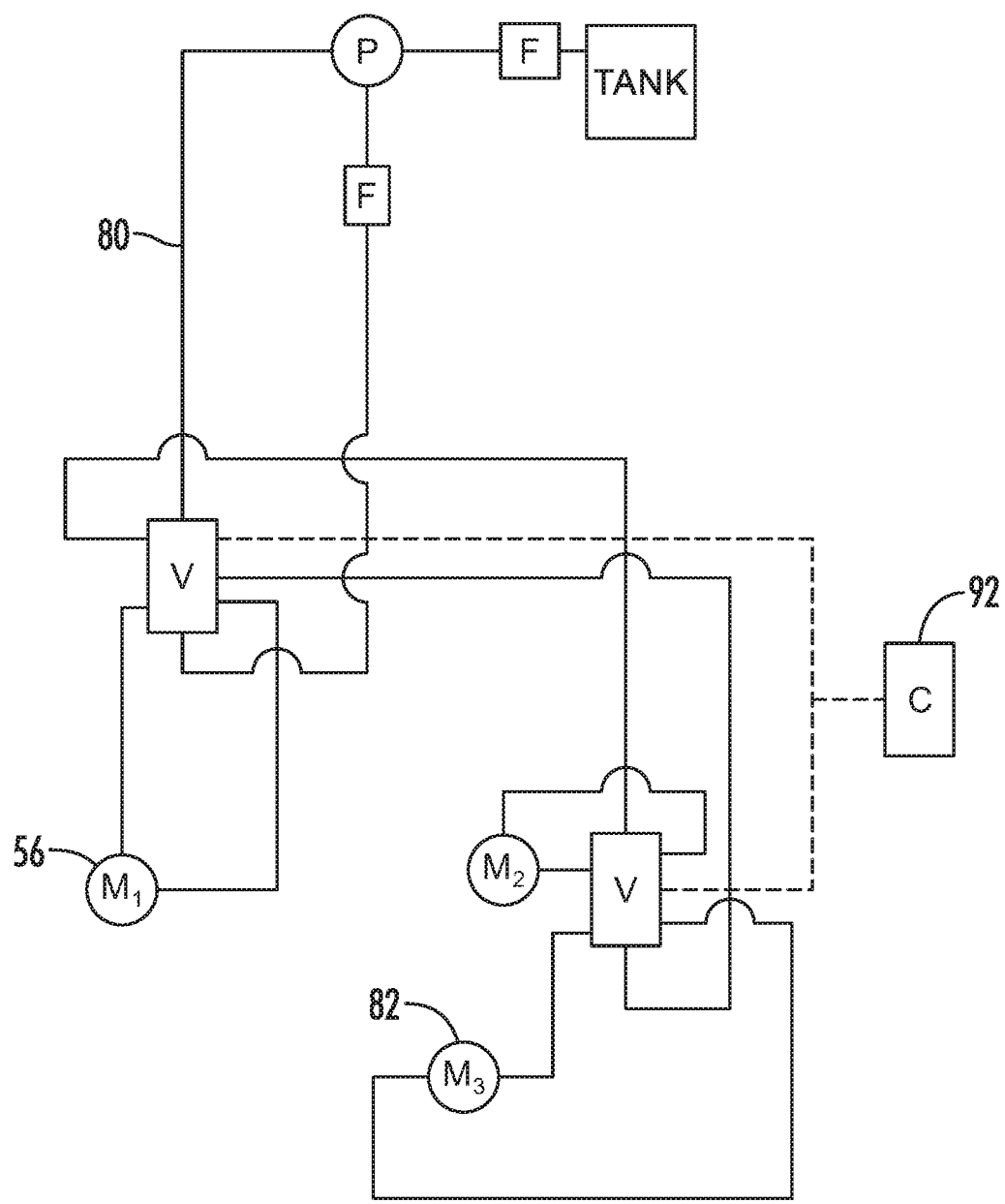
FIGS. 8A and 8B are schematic hydraulic diagrams of exemplary embodiments to convert a V-bed material handling truck to mulch blowing.
Figure 8B:
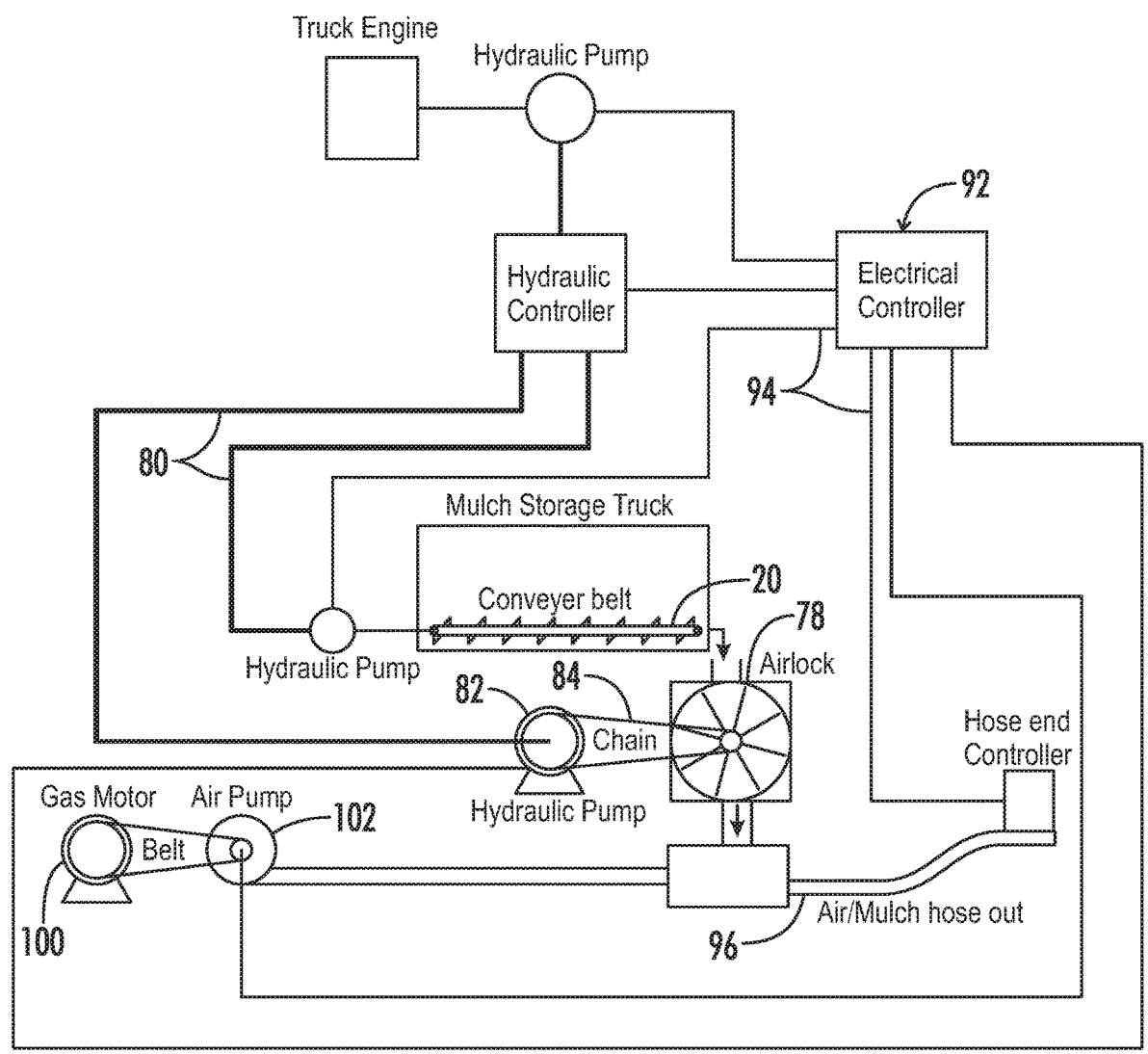

FIG. 8A provides a hydraulic schematic of an exemplary embodiment with hydraulic lines 80 connection hydraulic fluid reservoir tank through filter F to pump P and valves V to operate motors $M_1$, $M_2$, $M_3$ as directed by signals from controller C. In this illustration, each motor is hydraulic, so controller 92 communicates with valves V to operate the motors for the blower motor 56, the air lock motor 82, and the conveyor motor $M_2$. In the event that electric motors are used to power the blower, air lock or conveyor, then the controller 92 would signal directly to the motor controller associated with each electric motor.

Figure 9:
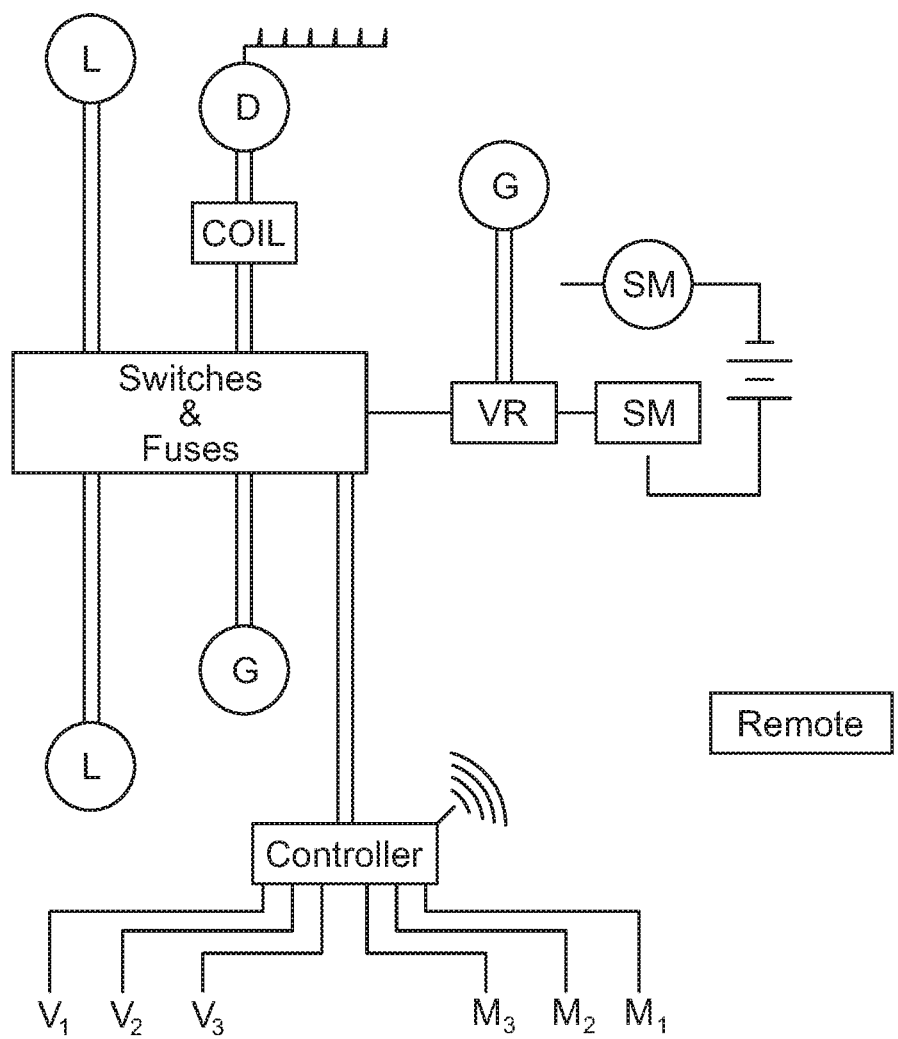
FIG. 9 is a simplified electrical schematic diagram of an exemplary conversion of a V-bed material handling truck to mulch blowing.
Figure 10A:
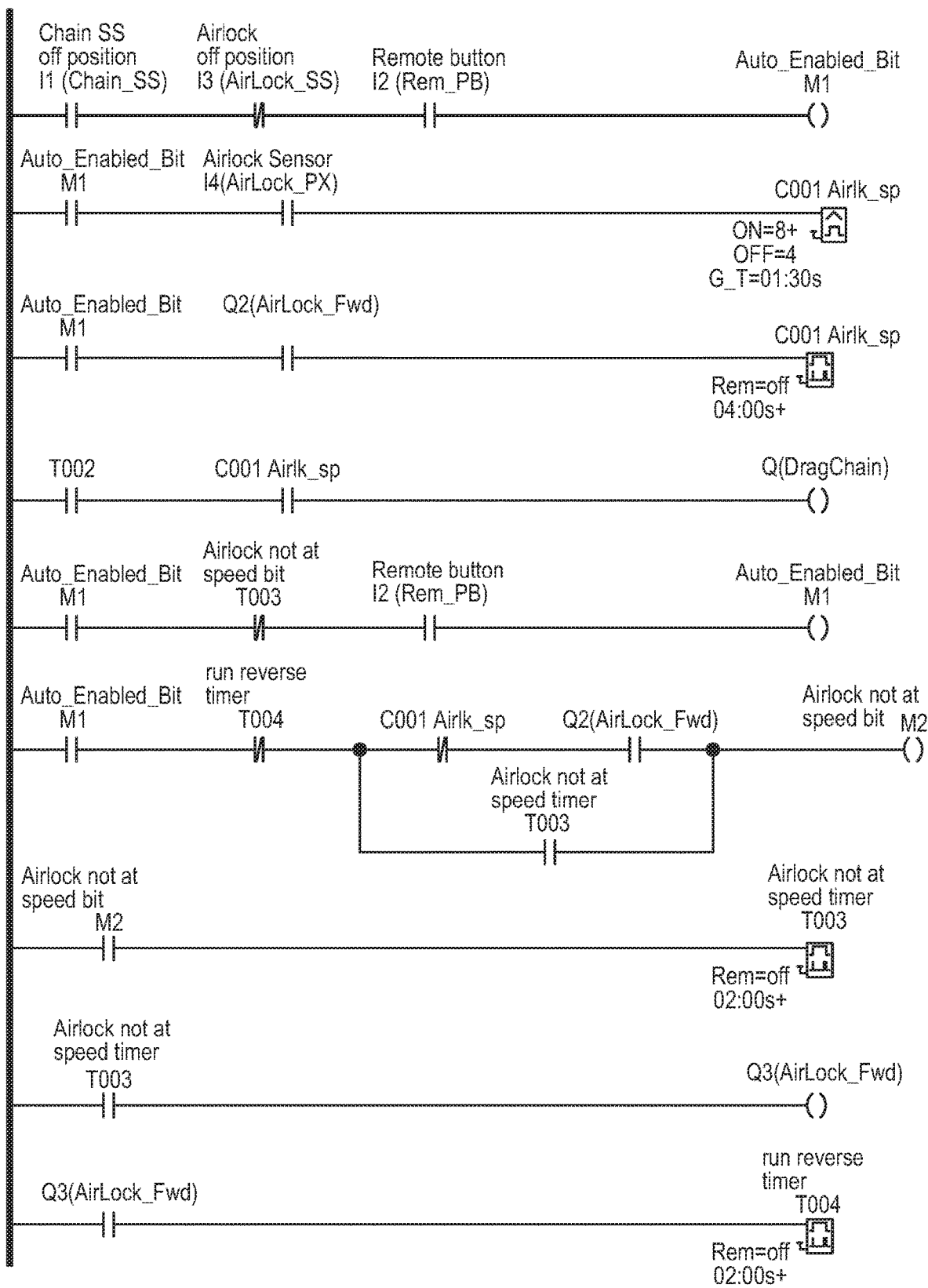

FIG. 9 provides a simplified electrical schematic of an exemplary embodiment with battery to operate solenoid S and starter motor SM, a generator G that provides electric current to voltage regulator VR and thence to the various switches and fuses that distribute current to front and rear lights L, the coil and distributor D and the spark plugs, the various gauges and instrumentation G of the vehicle, and the controller that communicates with either hydraulic valves $V_1$, $V_2$, $V_3$ or electric motors $M_1$, $M_2$, $M_3$ via their associated controllers. It will be understood that the hydraulic and electric motors may be mixed in a single truck, or one or more of the motors may be an independently powered combustion engine and the signals from the controller 92 directed to an electrical control interface for the operation of the device powered by that engine.

FIG. 10A through 10F is a representative instruction listing for a controller in simplified operation. It will be understood that the controller may be signaled by wired interface or wireless remote control.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart

I claim:

1. A spreader truck of the type utilizing a V-bed with an auger or drag link material handling system to move material toward a spreader at the rear of the truck wherein an agitator box at the rear of the truck provides access to the material handling system and the spreader is interchangeable between a centrifugal spreader for salt material and an air lock and blower for mulch material, such that the air lock meters the mulch to a pan and the blower is mounted to the truck to propel mulch from the pan through a delivery hose.

2. The truck of claim 1 wherein the material handling system and the air lock are hydraulically powered by a pump operated by an engine of the truck.

3. The truck of claim 1 wherein the delivery hose has a remote control for communicating operational signals to a controller in communication with the material handling system, air lock and blower.

4. The truck of claim 1 wherein the material handling system can be reversed to eliminate jamming of mulch.

5. The truck of claim 1 wherein the material handling system can be stopped and accessed via the agitator box to eliminate jams of mulch.

6. The truck of claim 1 wherein the blower is hydraulically powered.

7. The truck of claim 1 wherein the blower is powered by a gasoline engine.

8. The truck of claim 1 wherein the blower is operated by an electric motor powered by current from a generator driven by an engine of the truck.

9. The truck of claim 1 wherein the V-bed has a capacity of at least 4 yards of material.

10. A method of converting a salt spreader truck of the type utilizing a V-bed with an auger or drag link material handling system to move salt material to a centrifugal spreader at the rear of the truck to a mulch spreading truck comprising the steps of adding an agitator box at the rear of the truck to provide access to the material handling system, removing salt spreader apparatus, attaching an air lock to meter mulch fed by the material handling system to a pan, attaching a ram blower to propel mulch from the pan through a delivery hose, attaching a control system, connecting the air lock and the ram blower to electrical and hydraulic systems and providing the control system for operating the material handling system of the V-bed of the salt truck.

11. The method of claim 10 wherein the material handling system and the air lock are hydraulically powered by a pump operated by an engine of the truck.

12. The method of claim 10 wherein a single control system controls the material handling system, air lock and ram blower.

13. The method of claim 10 wherein the ram blower is driven by an electric motor powered by current from a generator driven by an engine of the truck.

14. The method of claim 10 wherein the control system allows the operator to drive the material handling system in forward and reverse.

15. The method of claim 10 wherein a remote control operates at least one of the ram blower, air lock, and material handling system.

* * * * *